(12) United States Patent
Kim

(10) Patent No.: US 9,240,578 B2
(45) Date of Patent: Jan. 19, 2016

(54) SECONDARY BATTERY

(75) Inventor: Jaehyung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 54 days.

(21) Appl. No.: 13/021,678

(22) Filed: Feb. 4, 2011

(65) Prior Publication Data

US 2011/0223461 A1  Sep. 15, 2011

Related U.S. Application Data

(60) Provisional application No. 61/312,125, filed on Mar. 9, 2010.

(51) Int. Cl.
*H01M 2/02* (2006.01)
*H01M 2/08* (2006.01)

(52) U.S. Cl.
CPC ........ *H01M 2/08* (2013.01); *H01M 2/02* (2013.01); *H01M 2/0262* (2013.01); *H01M 2/0277* (2013.01); *H01M 2/0282* (2013.01); *H01M 2/0285* (2013.01); *H01M 2/0287* (2013.01); *H01M 2/0217* (2013.01)

(58) Field of Classification Search
CPC ..................................................... H01M 2/02
USPC ............................................... 429/120
See application file for complete search history.

(56) References Cited

U.S. PATENT DOCUMENTS

| | | | |
|---|---|---|---|
| 4,937,153 A * | 6/1990 | Huhndorff | 429/61 |
| 5,556,722 A | 9/1996 | Narukawa et al. | |
| 5,682,288 A * | 10/1997 | Wani | 361/502 |
| 6,258,480 B1 * | 7/2001 | Moriwaki et al. | 429/176 |
| 6,632,538 B1 * | 10/2003 | Yamazaki et al. | 428/461 |
| 7,041,380 B2 * | 5/2006 | Yamashita et al. | 428/516 |
| 2004/0029001 A1 | 2/2004 | Yamazaki et al. | |
| 2004/0126657 A1 | 7/2004 | Chung | |
| 2004/0166406 A1 | 8/2004 | Higuchi et al. | |
| 2008/0233468 A1 | 9/2008 | Otohata et al. | |
| 2008/0254360 A1 * | 10/2008 | Miyazawa et al. | 429/184 |
| 2009/0186270 A1 | 7/2009 | Harada et al. | |

(Continued)

FOREIGN PATENT DOCUMENTS

| | | |
|---|---|---|
| CN | 1262790 | 8/2000 |
| EP | 0917217 A1 | 5/1999 |
| EP | 1315219 A1 | 5/2003 |

(Continued)

OTHER PUBLICATIONS

Extended European Search Report dated Jul. 11, 2011 in Application No. 11250274.5.

(Continued)

*Primary Examiner* — Basia Ridley
*Assistant Examiner* — James Erwin
(74) *Attorney, Agent, or Firm* — Knobbe Martens Olson & Bear LLP

(57) ABSTRACT

A secondary battery comprises an electrode assembly comprising a first electrode plate, a second electrode plate and a separator interposed between the first and second electrode plates; and a battery case accommodating the electrode assembly, the battery case comprising a first portion, a second portion, and an adhesive layer that contacts a surface of the first portion and a surface of the second portion, wherein the adhesive layer is continuous between the first and second portions.

23 Claims, 6 Drawing Sheets

(56) References Cited

U.S. PATENT DOCUMENTS

| | | |
|---|---|---|
| 2009/0191448 A1 | 7/2009 | Yamamoto et al. |
| 2012/0244421 A1 | 9/2012 | Yamazaki et al. |

FOREIGN PATENT DOCUMENTS

| | | |
|---|---|---|
| EP | 2333869 A1 | 6/2011 |
| GB | 2283089 | 4/1995 |
| JP | 03-68358 U | 7/1991 |
| JP | 06-124692 | 5/1994 |
| JP | 07-211300 A | 8/1995 |
| JP | 07-226192 A | 8/1995 |
| JP | 2001-357825 A | 12/2001 |
| JP | 2002-245984 | 8/2002 |
| JP | 2003-323869 | 11/2003 |
| JP | 2005-063856 | 3/2005 |
| JP | 2006-054099 A | 2/2006 |
| JP | 2008-218017 | 9/2008 |
| JP | 2009-259748 A | 11/2009 |
| JP | 2009-295381 A | 12/2009 |
| KR | 10-2000-0051779 | 8/2000 |
| KR | 10-0693288 | 3/2007 |

OTHER PUBLICATIONS

Office Action dated Jul. 3, 2012 for corresponding KR Application No. 10-2011-0013152.
Office Action dated May 24, 2013 for corresponding CN Application No. 201110056207.
Notice of Allowance issued on Mar. 25, 2013 for Japanese Patent Application No. 2011-046346.
Office Action dated Feb. 6, 2013 for corresponding JP Application No. 2011-046346.

\* cited by examiner

SECONDARY BATTERY

CROSS-REFERENCE TO RELATED APPLICATIONS

This application claims priority to and the benefit of U.S. Provisional Application No. 61/312,125, filed on Mar. 9, 2010, the entire content of which is incorporated herein by reference.

BACKGROUND

1. Field

Aspects of the present invention relate to a secondary battery.

2. Description of the Related Technology

A lithium secondary battery or rechargeable battery can be manufactured in a bare cell, and the bare cell may include an electrode assembly having a positive electrode plate, a negative electrode plate, and a separator, and a case for receiving the electrode assembly.

In general, a case for a bare cell is typically formed of an aluminum can or a composite aluminum pouch.

When the case is formed of an aluminum can, it is typically heavy while having a high strength. By contrast, when the case is formed of a composite aluminum pouch, it is typically poor in strength while being lightweight.

Accordingly, research is being conducted in secondary batteries having a case that is rigid and lightweight.

SUMMARY

Aspects of the present invention provide a secondary battery with increased resistance against external impacts, lightness and enhanced sealing efficiency.

According to aspects of the present invention, a secondary battery includes an electrode assembly having electrode tabs connected thereto, a hard case including a first hard case and a second hard case, and a thermal adhesion layer disposed at a contacting area of the first hard case and the second hard case.

According to aspects of the present invention, the thermal adhesion layer may be bonded by thermal bonding. In addition, the thermal adhesion layer may be a film-like layer. The thermal adhesion layer may include any one selected from modified polyolefine based materials and acid-modified polyolefine based materials. The thermal adhesion layer may be made of a material that is bonded by heat of approximately 130° C. or higher.

According to aspects of the present invention, the hard case may have a higher melting point than the thermal adhesion layer.

The hard case may be formed of at least one selected from the group consisting of polyolefine-based resin, epoxy resin, polycarbonate resin, polyethyleneterephthalate resin, polyetheretherketone resin, high-density polyethylene resin, and acryl-based resin.

In addition, the hard case may have a Rockwell hardness of not less than 55 R scales.

According to aspects of the present invention, each of the first hard case and the second hard case may be formed in a box shape. Here, each of the first hard case and the second hard case may have a thickness of approximately 0.5 mm or greater.

According to aspects of the present invention, the first hard case may be formed in a box shape and the second hard case may be formed in a plate shape.

According to aspects of the present invention, the first hard case may further include a first metal layer formed on the outer surface thereof, and the second hard case may further include a second metal layer formed on the outer surface thereof.

Here, each of the first metal layer and the second metal layer may be made of at least one selected from the group consisting of aluminum (Al), nickel (Ni), iron (Fe), and copper (Cu).

According to aspects of the present invention, the first hard case may further include a first metal layer formed therein, and the second hard case may further include a second metal layer formed therein.

According to aspects of the present invention, the first hard case may further include a first metal layer formed on the inner surface thereof, and the second hard case may further include a second metal layer formed on the inner surface thereof.

According to aspects of the present invention, the first hard case may further include a first thermal conduction layer formed therein, and the second hard case may further include a second thermal conduction formed therein.

Here, each of the first thermal conduction layer and the second thermal conduction layer may be formed by impregnating ceramic powder into polymer fiber or non-woven fabric.

According to aspects of the present invention, each of the first hard case and the second hard case may be formed in a box shape. The first hard case may have an accommodating portion for accommodating ends of the second hard case at contacting areas S thereof where the first hard case and second hard case are coupled to each other. Here, each of the first and second hard cases may have a thickness of 0.3 mm or greater. In addition, a thermal adhesion layer may be disposed within the accommodating portion.

In the secondary battery according to an exemplary embodiment, a hard case surrounding an electrode assembly is formed using a plastic resin that is lightweight and resistant against external impacts, thereby increasing the resistance against external impacts and realizing lightness in a simplified manner.

In addition, since the secondary battery includes a hard case constituted by a first hard case and a second hard case, which are coupled to each other by thermal bonding using a thermal adhesion layer, the sealing efficiency of the hard case can be enhanced.

BRIEF DESCRIPTION OF THE DRAWINGS

The aspects, features and advantages of embodiments of the present invention will be more apparent from the following detailed description in conjunction with the accompanying drawings, in which.

DETAILED DESCRIPTION

Embodiments of the present invention will now be described in detail with reference to the accompanying figures.

Figure 1:
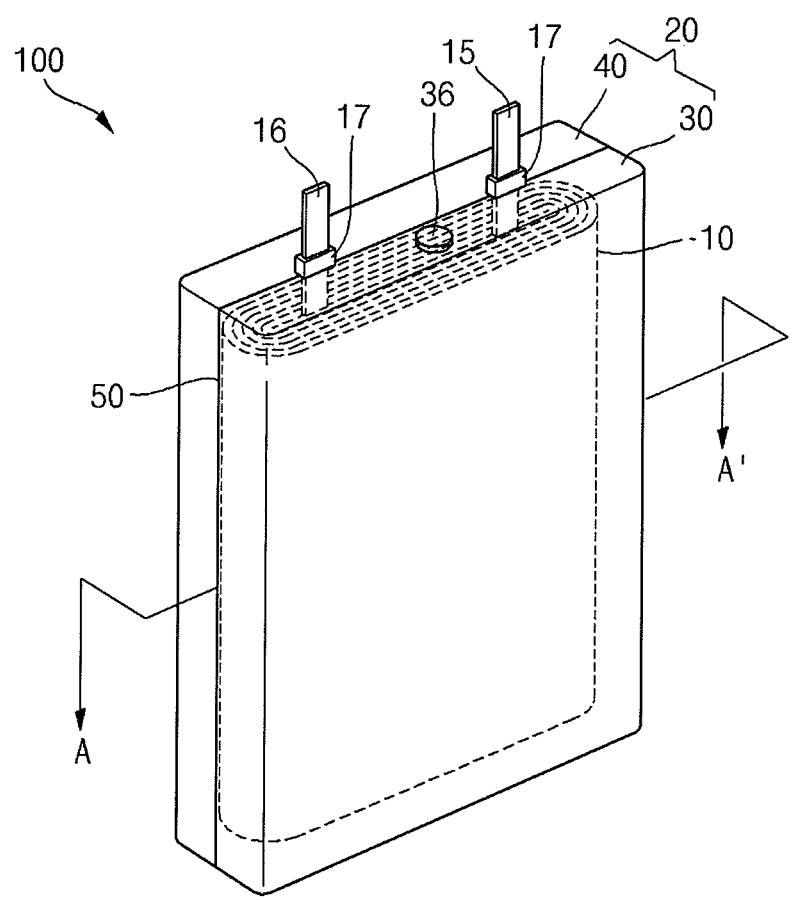
FIG. 1 is an assembled perspective view of a secondary battery according to an embodiment of the present invention.
Figure 2:
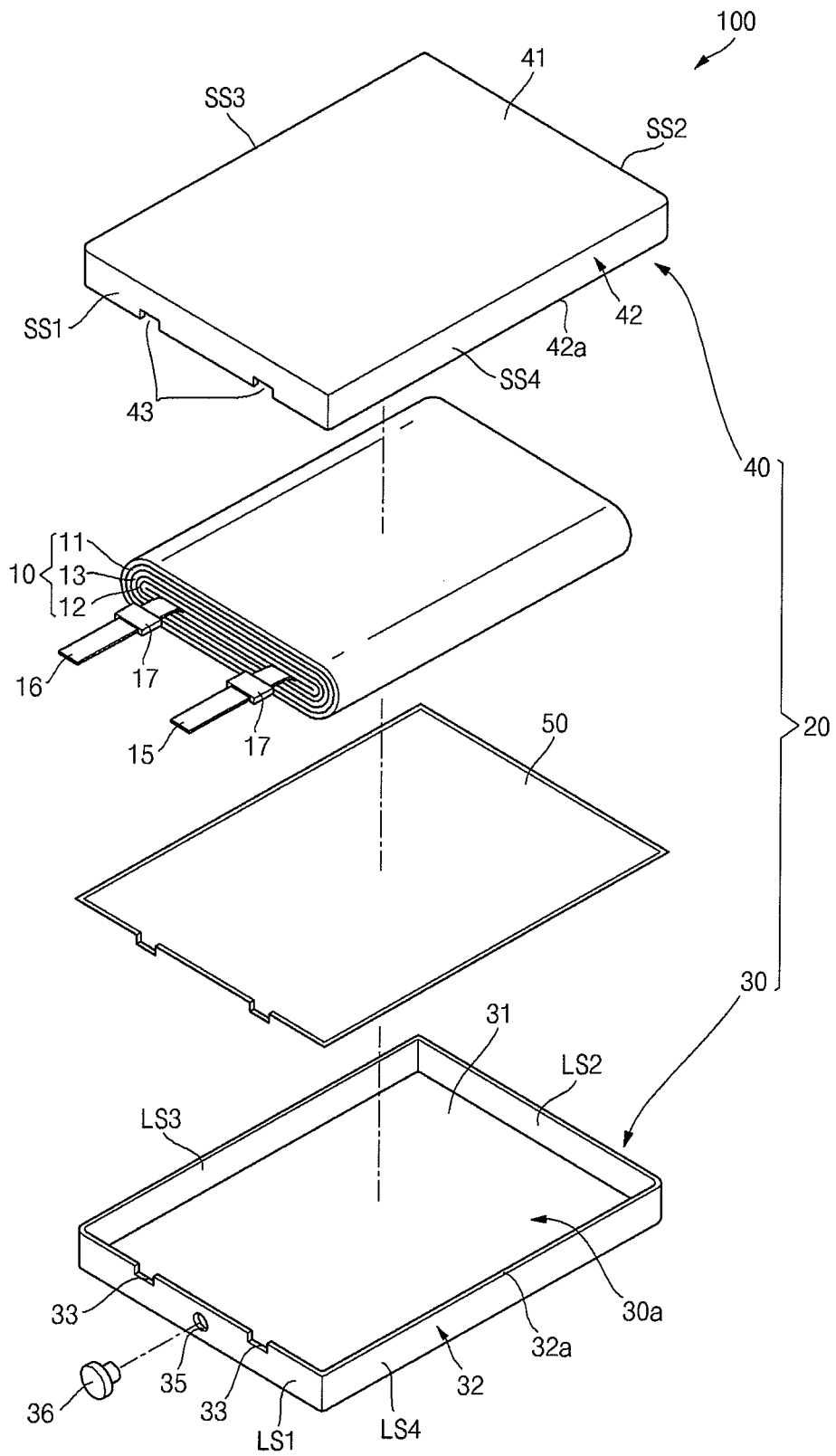
FIG. 2 is a disassembled perspective view of the secondary battery shown in FIG. 1.
Figure 3:
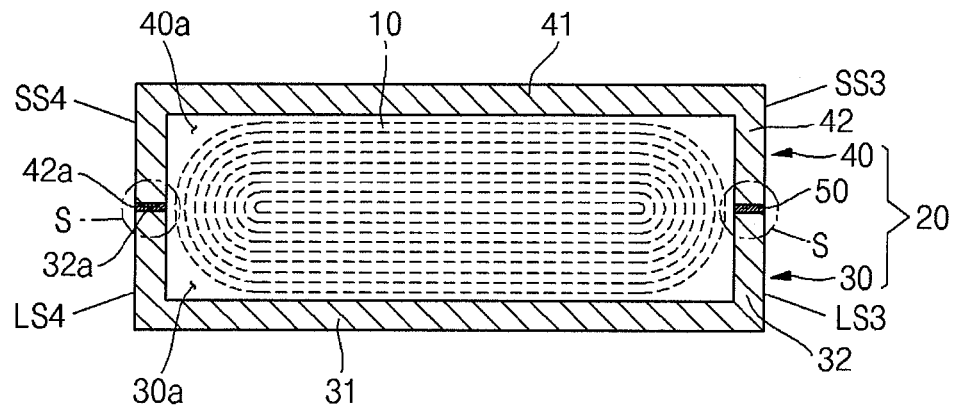
FIG. 3 is a sectional view taken along line A-A' of FIG. 1.

FIG. 1 is an assembled perspective view of a secondary battery according to an embodiment of the present invention, FIG. 2 is a disassembled perspective view of the secondary battery shown in FIG. 1, and FIG. 3 is a sectional view taken along line A-A' of FIG. 1.

Referring to FIGS. 1 and 2, the secondary battery 100 according to an embodiment of the present invention includes an electrode assembly 10, a hard case (or a battery case) 20 and a thermal adhesion layer (or an adhesive layer) 50. The secondary battery 100 may be electrically connected to an external electric device (not shown) to perform a charging operation to be supplied with power or a discharging operation to supply power.

The electrode assembly 10 may be formed by winding or stacking a laminate of a first electrode plate 11, a separator 13, and a second electrode plate 12, which are formed as a thin plate or layer. In addition, the electrode assembly 10 can include electrode tabs, that is, a first electrode tab 15 and a second electrode tab 16. Here, the outer surface of the electrode assembly 10 may have a rounded profile.

According to an embodiment, the first electrode plate 11 can include a first electrode collector formed of aluminum foil, and a first electrode active material coated on the first electrode collector. Lithium cobalt oxide ($LiCoO_2$) may be used as the first electrode active material.

According to an embodiment, the second electrode plate 12 can include a second electrode collector formed of a copper foil, and a second electrode active material coated on the second electrode collector. Carbon may be used as the second electrode active material.

The first electrode plate 11 may operate as a positive electrode and the second electrode plate 12 may operate as a negative electrode. The first electrode plate 11 and the second electrode plate 12 may have different polarities.

The separator 13 may be made of polyethylene, polypropylene, or a copolymer of polyethylene and polypropylene. The separator 13 may be formed to have a width greater than the first electrode plate 11 or the second electrode plate 12, which is advantageous for preventing an electrical short-circuit between the electrode plates 11 and 12.

The first electrode tab 15 and the second electrode tab 16 extending from the first electrode plate 11 and the second electrode plate 12 may electrically connect the electrode assembly 10 to an external device (not shown). Insulating tapes 17 for preventing short-circuits between the first electrode tab 15 and the second electrode tab 16 may be disposed on boundary portions of the first electrode tab 15 and the second electrode tab 16, which extend through a lower case 20.

The hard case 20 may accommodate the electrode assembly 10 and an electrolyte (not shown), and may include a first hard case (or a first portion) 30 and a second hard case (or a second portion) 40. The hard case 20 may surround the electrode assembly 10 to protect the same from the outside. Here, the electrolyte is impregnated into the electrode assembly 10 and may be disposed between the hard case 20 and electrode assembly 10.

The first hard case 30 may be shaped of a box having one surface opened to accommodate the electrode assembly 10. In detail, the first hard case 30 can include a first bottom surface (or a first main surface) 31, a first lateral surface (or first lateral edge) 32 bent and extending from an end of the first bottom surface 31, and first grooves 33 formed at portions of the first lateral surface 32 to allow the first electrode tab 15 and the second electrode tab 16 to pass. Here, a first lead-out surface LS1 of the first lateral surface 32, from which the first electrode tab 15 and the second electrode tab 16 are drawn out, a first opposite surface LS2 facing and opposite to the first lead-out surface LS1, and first connection surfaces LS3 and LS4 connected to the first lead-out surface LS1 and the first opposite surface LS2, may be at right angle with respect to the first bottom surface 31, respectively, to facilitate a formation process of the first hard case 30.

In addition, the first hard case 30 may include an electrolyte injection hole 35 through which the electrolyte (not shown) is injected into the hard case 20. The electrolyte injection hole 35 may be sealed by a plug 36. The electrolyte injection hole 35 may be formed in the second hard case 40, and the formation location of the electrolyte injection hole 35 is not limited to the illustrated example. Meanwhile, a space within the first hard case 30 that accommodates a portion of the electrode assembly 10 is referred to herein as a first space 30a.

Like the first hard case 30, the second hard case 40 may be shaped of a box having one surface opened to accommodate the electrode assembly 10. In detail, the second hard case 40 may include a second bottom surface (or a second main surface) 41, a second lateral surface (or a second lateral edge) 42 bent and extending from an end of the second bottom surface 41, and second grooves 43 formed at portions of the second lateral surface 42 to allow the first electrode tab 15 and the second electrode tab 16 to pass. Here, a second lead-out surface SS1 of the second lateral surface 42, from which the first electrode tab 15 and the second electrode tab 16 are drawn out, a second opposite surface SS2 facing and opposite to the second lead-out surface SS1, and second connection surfaces SS3 and SS4 connected to the second lead-out surface SS1 and the second opposite surface SS2, may be at right angle with respect to the second bottom surface 41, respectively, to facilitate a formation process of the second hard case 40.

Meanwhile, a space within the second hard case 40 that accommodates the remaining portion of the electrode assembly 10 is referred to herein as a second space 40a.

In order to increase the resistance of the hard case 20 against external impacts, the first hard case 30 and the second hard case 40 may be formed of a plastic resin that is resistant against external impacts and lightweight, that is, at least one selected from the group consisting of polyolefine-based resin, epoxy resin, polycarbonate resin, polyethyleneterephthalate resin, polyetheretherketone resin, high-density polyethylene resin, and acryl-based resin. Examples of the polyolefine-based resin may include polypropylene resin and polyethylene resin. Examples of the acryl-based resin may include polymethlymethacrylate resin. Here, materials for forming the first hard case 30 and the second hard case 40 may have a Rockwell hardness of not less than 55 R scales to have a scratch-proof property, which, can improve the external appearance of the hard case 20. In addition, internal surfaces of the first hard case 30 and the second hard case 40 may be constructed so as to not react with the electrolyte, or be subjected to surface treatment. Further, each of the first hard case 30 and the second hard case 40 may have a thickness of approximately 0.5 mm or greater to maintain the mechanical strength against external impacts after they are coupled to each other. Here, upper limits to the thicknesses of the first hard case 30 and the second hard case 40 are not defined because the respective thicknesses of the first hard case 30 and the second hard case 40 may vary according to materials forming the same and to the use of the secondary battery.

The first hard case 30 and the second hard case 40 may be formed by separately performing injection molding, respectively.

The thermal adhesion layer 50, as illustrated in FIG. 3, may be disposed at a contacting area S of the first hard case 30 and the second hard case 40. In detail, the thermal adhesion layer 50 may be disposed between an end 32a of the first lateral surface 32 and an end 42a of the second lateral surface 42 in a continuous manner, or such that no other element exists between the end 32a of the first lateral surface 32 and the end 42a of the second lateral surface 42. The thermal adhesion layer 50 may be a casted polypropylene film-like layer, which is disposed at the end 32a of the first lateral surface 32 or the end 42a of the second lateral surface 42, and may couple the first hard case 30 and the second hard case 40 to each other by thermal bonding. Since the thermal adhesion layer 50 may be subjected to thermal bonding in a state in which it is disposed between the end 32a of the first lateral surface 32 and the end 42a of the second lateral surface 42 in a continuous manner, the sealing efficiency of the first hard case 30 and the second hard case 40 can be enhanced. Here, the thermal adhesion layer 50 may be made of a material that is bonded by heat of approximately 130° C. or higher, and examples thereof may include any one material selected from modified polyolefine-based materials and acid-modified polyolefine-based materials. Examples of the modified polyolefine-based materials may include modified polypropylene, and examples of the acid-modified polyolefine-based materials may include acid-modified polypropylene.

Meanwhile, materials for forming the first hard case 30 and the second hard case 40 may have a higher melting point than for forming the thermal adhesion layer 50. If the materials for forming the first hard case 30 and the second hard case 40 have a lower melting point than for forming the thermal adhesion layer 50, the first hard case 30 and the second hard case 40 may be melted by heat for bonding the thermal adhesion layer 50.

As described above, in the secondary battery 100 according to an embodiment of the present invention, the hard case 20 surrounding the electrode assembly 10 may be formed using a plastic resin that is lightweight and resistant against external impacts. Thus, a secondary battery may be formed with increased resistance against external impacts and lightness in a simplified manner, compared to the conventional battery in which an electrode assembly is surrounded by an aluminum can or wrapped by a pouch formed of an aluminum composite material, which can involve complex manufacturing processes.

In addition, since the secondary battery 100 may include the hard case 20 constituted by the first hard case 30 and the second hard case 40, which may be coupled to each other by thermal bonding using the thermal adhesion layer 50, the sealing efficiency of the hard case 20 can be enhanced, compared to the conventional secondary battery in which cases are coupled to each other by ultrasonic welding.

A secondary battery according to another embodiment of the present invention will now be described.

Figure 4:
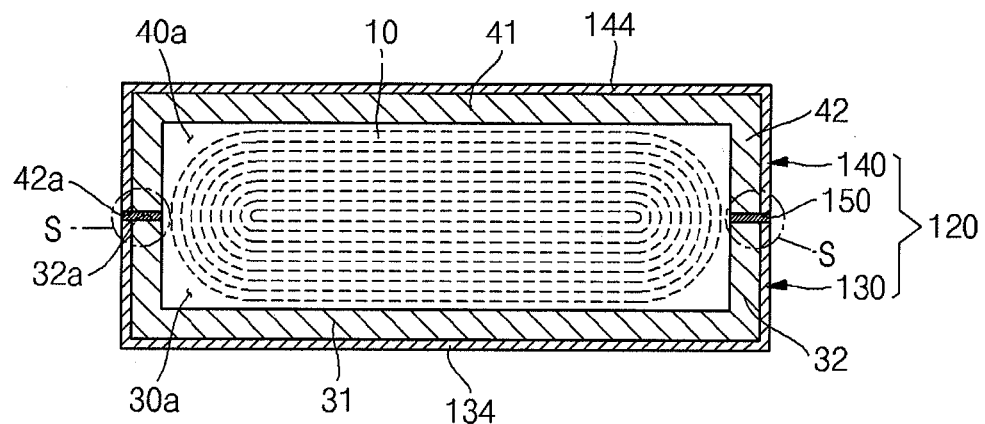
FIG. 4 is a sectional view illustrating components corresponding to those of the secondary battery shown in FIG. 3 in a secondary battery according to another embodiment of the present invention.

FIG. 4 is a sectional view illustrating components corresponding to those of the secondary battery shown in FIG. 3 in a secondary battery according to another embodiment of the present invention.

The secondary battery according to the embodiment of FIG. 4 is substantially the same as the secondary battery 100 shown in FIG. 2 in view of configuration and functions, except for the configurations of a hard case 120 and a thermal adhesion layer 150. Thus, repetitive explanations will be omitted and the following description will be focused on the hard case 120 and the thermal adhesion layer 150.

Referring to FIG. 4, the hard case 120 can include a first hard case 130 and a second hard case 140. The hard case 120 can be substantially the same as the hard case 20 shown in FIG. 3, except that the first hard case 130 of the hard case 120 can further include a first metal layer 134 formed on the outer surface thereof, and the second hard case 140 can further include a second metal layer 144 formed on the outer surface thereof.

Each of the first metal layer 134 and the second metal layer 144 may be made of a metallic material, and examples thereof may include any one selected from aluminum (Al), nickel (Ni), iron (Fe) and copper (Cu). The first metal layer 134 and the second metal layer 144 can effectively prevent external moisture from being infiltrated into the hard case 120. In addition, the first metal layer 134 and the second metal layer 144 can prevent the electrolyte accommodated in the hard case 120 from leaking outside. Further, the first metal layer 134 and the second metal layer 144 can further enhance the strength of the hard case 120 against external impacts.

The thermal adhesion layer 150 may be substantially the same as the thermal adhesion layer 50 shown in FIG. 3, except that the thermal adhesion layer 150 may be larger than the thermal adhesion layer 50 shown in FIG. 3 so as to couple the first hard case 130 including the first metal layer 134 and the second hard case 140 including the second metal layer 144 to each other.

As described above, in the secondary battery according to another embodiment of the present invention, the first metal layer 134 and the second metal layer 144 may be further formed on outer surfaces of the first hard case 130 and the second hard case 140, respectively, thereby effectively preventing internal components from corroding due to infiltration of moisture. In addition, malfunctions in charging and discharging operations due to electrolyte leakage can be effectively prevented. Moreover, the electrode assembly 10 can be protected from external impacts more efficiently.

A secondary battery according to still another embodiment of the present invention will now be described.

Figure 5:
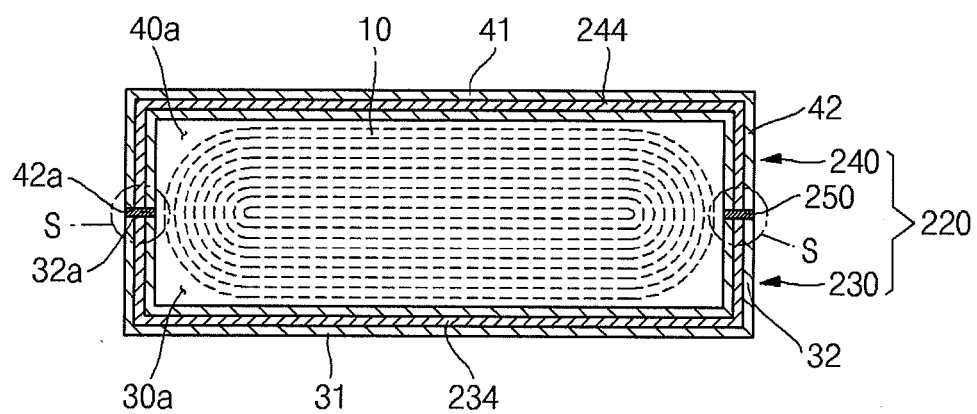
FIG. 5 is a sectional view illustrating components corresponding to those of the secondary battery shown in FIG. 3 in a secondary battery according to still another embodiment of the present invention.

FIG. 5 is a sectional view illustrating components corresponding to those of the secondary battery shown in FIG. 3 in a secondary battery according to still another embodiment of the present invention.

The secondary battery according to the current embodiment may be substantially the same as the secondary battery 100 shown in FIG. 2 in view of configuration and functions, except for the configurations of a hard case 220 and a thermal adhesion layer 250. Thus, repetitive explanations will be omitted and the following description will be focused on the hard case 220 and the thermal adhesion layer 250.

Referring to FIG. 5, the hard case 220 can include a first hard case 230 and a second hard case 240. The hard case 220 may be substantially the same as the hard case 120 shown in FIG. 4, except that the first hard case 230 of the hard case 220 can further include a first metal layer 234 formed therein, and the second hard case 240 can further include a second metal layer 244 formed therein.

The first metal layer 234 and the second metal layer 244 can enhance the efficiency of coupling the first hard case 230 and the second hard case 240 to each other. In addition, the first metal layer 234 and the second metal layer 244 can prevent external moisture from being infiltrated into the hard case 220 or the electrolyte accommodated in the hard case 220 from leaking outside. Moreover, the first metal layer 234 and the second metal layer 244 can further enhance the strength of the hard case 220 against external impacts. In the embodiment shown in FIG. 5, the first metal layer 234 is thinner than a portion of the first hard case 230, the portion excluding the first metal layer 234 from the first hard case 230, and the second metal layer 244 is thinner than a portion of the second hard case 240, the portion excluding the second metal layer 244 from the second hard case 240. In alternative embodiments, however, in order to further enhance the strength of the hard case 220 against external impacts, the first metal layer 234 may be formed to be thicker than a portion of the first hard case 230, the portion excluding the first metal layer 234 from the first hard case 230, and the second metal layer 244 may be formed to be thicker than a portion of the second hard case 240, the portion excluding the second metal layer 244 from the second hard case 240.

The thermal adhesion layer 250 may be substantially the same as the thermal adhesion layer 50 shown in FIG. 3, except that the thermal adhesion layer 250 may be larger than the thermal adhesion layer 50 shown in FIG. 3 so as to couple the first hard case 230 including the first metal layer 234 and the second hard case 240 including the second metal layer 244 to each other.

As described above, in the secondary battery according to still another embodiment of the present invention, the first metal layer 234 and the second metal layer 244 may be further formed in the first hard case 230 and the second hard case 240, respectively, thereby allowing the first metal layer 234 and the second metal layer 244 to be coupled to the first hard case 230 and the second hard case 240, respectively, in a more secured manner. In addition, it is possible to effectively prevent internal components from corroding due to infiltration of moisture. In addition, malfunctions in charging and discharging operations due to electrolyte leakage can be effectively prevented. Moreover, the electrode assembly 10 can be protected from external impacts more efficiently.

A secondary battery according to still another embodiment of the present invention will now be described.

Figure 6:
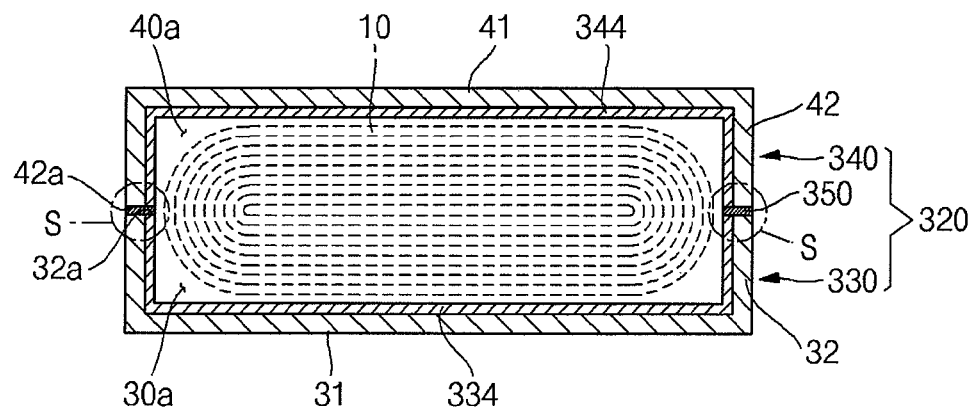
FIG. 6 is a sectional view illustrating components corresponding to those of the secondary battery shown in FIG. 3 in a secondary battery according to still another embodiment of the present invention.

FIG. 6 is a sectional view illustrating components corresponding to those of the secondary battery shown in FIG. 3 in a secondary battery according to still another embodiment of the present invention.

The secondary battery according to the current embodiment may be substantially the same as the secondary battery 100 shown in FIG. 2 in view of configuration and functions, except for the configurations of a hard case 320 and a thermal adhesion layer 350. Thus, repetitive explanations will be omitted and the following description will be focused on the hard case 320 and the thermal adhesion layer 350.

Referring to FIG. 6, the hard case 320 can include a first hard case 330 and a second hard case 340. The hard case 320 may be substantially the same as the hard case 120 shown in FIG. 4, except that the first hard case 330 of the hard case 320 may further include a first metal layer 334 formed on the inner surface thereof, and the second hard case 340 may further include a second metal layer 344 formed on the inner surface thereof. The first metal layer 334 and the second metal layer 344 can effectively prevent the electrolyte accommodated in the hard case 320 from leaking outside. In addition, the first metal layer 334 and the second metal layer 344 can prevent external moisture from being infiltrated into the hard case 320. The strength of the hard case 320 against external impacts can further be enhanced.

The thermal adhesion layer 350 may be substantially the same as the thermal adhesion layer 50 shown in FIG. 3, except that the thermal adhesion layer 350 may be larger than the thermal adhesion layer 50 shown in FIG. 3 so as to couple the first hard case 330 including the first metal layer 334, and the second hard case 340 including the second metal layer 344 to each other.

As described above, in the secondary battery according to still another embodiment of the present invention, the first metal layer 334 and the second metal layer 344 may be further formed on inner surfaces of the first hard case 330 and the second hard case 340, respectively, thereby effectively preventing charging and discharging operations from malfunctioning due to electrolyte leakage. In addition, it is possible to effectively prevent internal components from corroding due to infiltration of moisture. Further, the electrode assembly 10 can be protected from external impacts more efficiently.

A secondary battery according to still another embodiment of the present invention will now be described.

Figure 7:
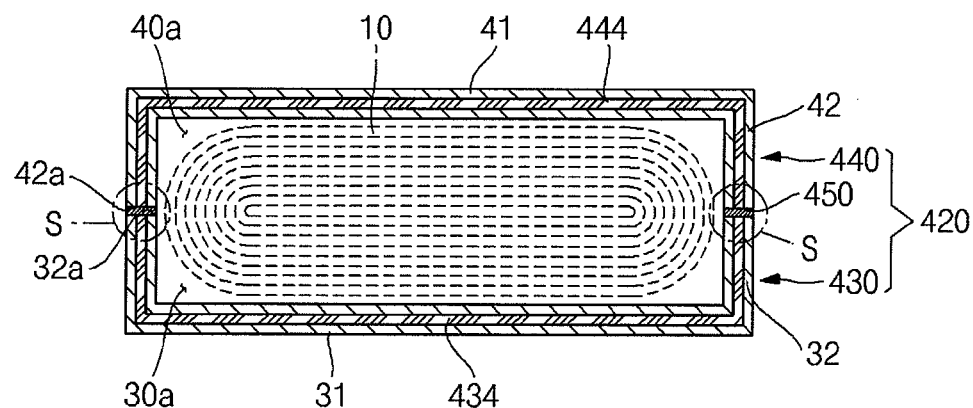
FIG. 7 is a sectional view illustrating components corresponding to those of the secondary battery shown in FIG. 3 in a secondary battery according to still another embodiment of the present invention.

FIG. 7 is a sectional view illustrating components corresponding to those of the secondary battery shown in FIG. 3, for a secondary battery according to still another embodiment of the present invention.

The secondary battery according to the current embodiment may be substantially the same as the secondary battery 100 shown in FIG. 2 in view of configuration and functions, except for the configurations of a hard case 420 and a thermal adhesion layer 450. Thus, repetitive explanations will be omitted and the following description will be focused on the hard case 420 and the thermal adhesion layer 450.

Referring to FIG. 7, the hard case 420 can include a first hard case 430 and a second hard case 440. The hard case 420 may be substantially the same as the hard case 20 shown in FIG. 3, except that the first hard case 430 of the hard case 420 further includes a first thermal conduction layer 434 formed therein, and the second hard case 440 further includes a second thermal conduction 444 formed therein.

Each of the first thermal conduction layer 434 and the second thermal conduction layer 444 may be formed by impregnating a thermally conductive material into a base having a high tensile strength and heat resistance. For example, each of the first thermal conduction layer 434 and the second thermal conduction layer 444 may be formed by impregnating ceramic powder into polymer fiber or non-woven fabric. The first thermal conduction layer 434 and the second thermal conduction layer 444 may reinforce the strength of the hard case 420 by using polymer fiber or non-woven fabric while preventing the temperature of the secondary battery from partially rising by transmitting the internal heat generated from the secondary battery evenly all over the hard case 420 using ceramic powder.

The thermal adhesion layer 450 may be substantially the same as the thermal adhesion layer 50 shown in FIG. 3, except that the thermal adhesion layer 450 is larger than the thermal adhesion layer 50 shown in FIG. 3 so as to couple the first hard case 430 including the first metal layer 434, and the second hard case 440 including the second metal layer 444 to each other.

As described above, in the secondary battery according to still another embodiment of the present invention, the first thermal conduction layer 434 and the second thermal conduction layer 444 may be further formed in the first hard case 430 and the second hard case 440, respectively, thereby protecting the electrode assembly 10 from external impacts more efficiently. In addition, it is possible to prevent the life of the secondary battery from deteriorating due to a partial temperature rise.

A secondary battery according to still another embodiment of the present invention will now be described.

Figure 8:
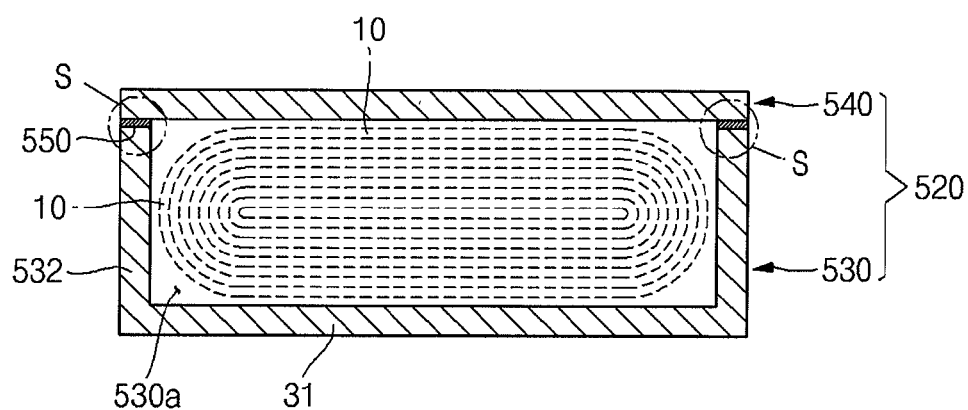
FIG. 8 is a sectional view illustrating components corresponding to those of the secondary battery shown in FIG. 3 in a secondary battery according to still another embodiment of the present invention.

FIG. 8 is a sectional view illustrating components corresponding to those of the secondary battery shown in FIG. 3 in a secondary battery according to still another embodiment of the present invention.

The secondary battery according to the current embodiment may be substantially the same as the secondary battery 100 shown in FIG. 2 in view of configuration and functions, except for the configurations of a hard case 520 and a thermal adhesion layer 550. Thus, repetitive explanations will be omitted and the following description will be focused on the hard case 520 and the thermal adhesion layer 550.

Referring to FIG. 8, the hard case 520 may include a first hard case 530 having a first bottom surface 531 and a first lateral surface 532, and a second hard case 540. The hard case 520 may be substantially the same as the hard case 20 shown in FIG. 3, except that the first hard case 530 of the hard case 520 is formed in a box shape, and the second hard case 540 is formed in a plate shape.

The first hard case 530 and the second hard case 540 having the aforementioned configurations can facilitate alignment when they are coupled to each other. Here, the first hard case 530 may have a first lateral surface 532 with a height greater than a height of the first lateral surface 32 of the first hard case 30 shown in FIG. 3, providing for a first space 530a for accommodating the electrode assembly 10 entirely in the first hard case 530.

As described above, the secondary battery according to still another embodiment of the present invention can include the first hard case 530 that is box-shaped, and the second hard case 540 that is plate-shaped, thereby manufacturing the hard case 520 in a simplified manner.

A secondary battery according to still another embodiment of the present invention will now be described.

Figure 9:
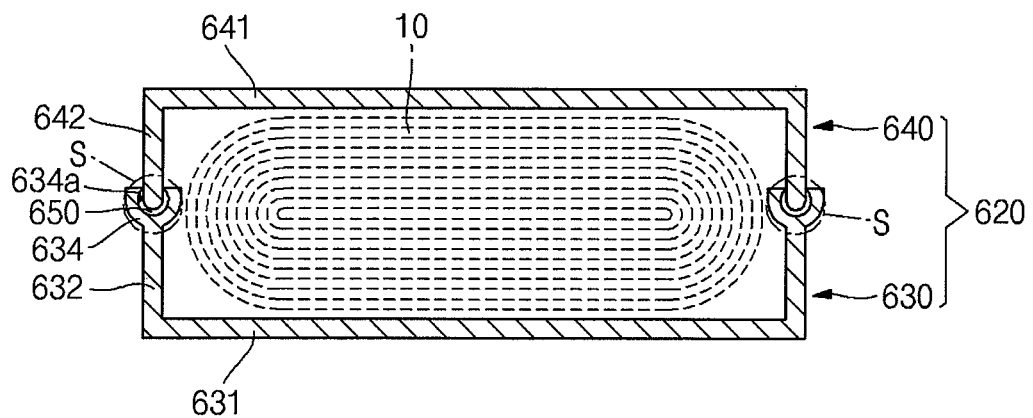
FIG. 9 is a sectional view illustrating components corresponding to those of the secondary battery shown in FIG. 3 in a secondary battery according to still another embodiment of the present invention.

FIG. 9 is a sectional view illustrating components corresponding to those of the secondary battery shown in FIG. 3 in a secondary battery according to still another embodiment of the present invention.

The secondary battery according to the current embodiment may be substantially the same as the secondary battery 100 shown in FIG. 2 in view of configuration and functions, except for the configurations of a hard case 620 and a thermal adhesion layer 650. Thus, repetitive explanations will be omitted and the following description will be focused on the hard case 620 and the thermal adhesion layer 650.

Referring to FIG. 9, the hard case 620 can include a first hard case 630 and a second hard case 640. The hard case 620 may be substantially the same as the hard case 20 shown in FIG. 3, except that the first and second hard cases 630 and 640 of the hard case 620 have thicknesses of, for example, 0.3 mm or greater, which are smaller than the thicknesses of the first and second hard cases 30 and 40 shown in FIG. 3. This is because the first hard case 630 has an accommodating portion 634, accommodating ends of lateral surfaces 642 of the second hard case 640 at contacting areas S where the first hard case 630 and the second hard case 640 contact. That is to say, a coupling structure of the first hard case 630 and the second hard case 640 can be securely supported by the accommodating portion 634. Here, upper limits in thicknesses of the first hard case 630 and the second hard case 640 are not defined because the respective thicknesses of the first hard case 630 and the second hard case 640 may vary according to materials forming the same and usage of secondary battery manufactured. In detail, the accommodating portion 634 may have grooves 634a formed at ends of first lateral surfaces 632 so as to accommodate ends of the second hard case 640. The ends of the second lateral surface 642 may form to correspond to the grooves 634a formed in the accommodating portion 634 so as to be smoothly accommodated in the grooves 634a of the accommodating portion 634.

The thermal adhesion layer 650 may be substantially the same as the thermal adhesion layer 50 shown in FIG. 3, except that the thermal adhesion layer 650 is accommodated in the groove 634a of the accommodating portion 634.

As described above, in the secondary battery according to still another embodiment of the present invention, the hard case 620 may be formed such that the first hard case 630 having the accommodating portion 634, and the second hard case 640, are formed thinly respectively, thereby increasing the size of the electrode assembly 10 in the secondary battery of the same size, ultimately increasing the battery capacity.

Next, a secondary battery according to another embodiment of the present invention will be described.

Figure 10:
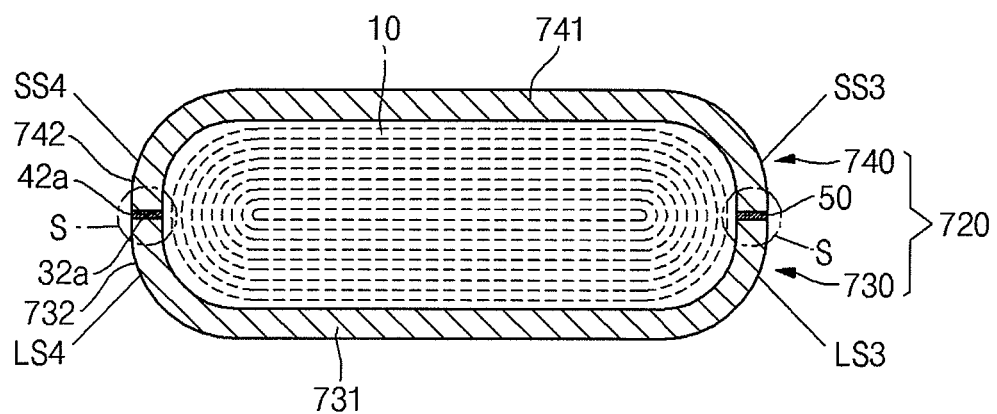
FIG. 10 is a sectional view illustrating components corresponding to those of the secondary battery shown in FIG. 3 in a secondary battery according to still another embodiment of the present invention.

FIG. 10 is a sectional view illustrating components corresponding to those of the secondary battery shown in FIG. 3 in a secondary battery according to still another embodiment of the present invention.

The secondary battery according to the current embodiment may be substantially the same as the secondary battery 100 shown in FIG. 2 in view of configuration and functions, except for the configurations of a hard case 720. Thus, repetitive explanations will be omitted and the following description will be focused on the hard case 720.

Referring to FIG. 10, the hard case 720 includes a first hard case 730 having a first bottom surface 731 and a first lateral surface 732, and a second hard case 740 having a second bottom surface 741 and a second lateral surface 742.

The hard case 720 may be substantially the same as the hard case 20 shown in FIG. 3. However, in the first hard case 730 of the hard case 720, each of first connection surfaces LS3 and LS4 of the first lateral surface 732 may have a rounded corner where each of the first connection surfaces LS3 and LS4 and the first bottom surface 731 meet, which would reduce unnecessary space from the first hard case 730 between the electrode assembly 10 and the first hard case 730.

The first connection surfaces LS3 and LS4 may be connected to a first lead-out surface LS1 (shown in FIG. 2), from which the first electrode tab 15 (shown in FIG. 2) and the second electrode tab 16 (shown in FIG. 2) are drawn out, and a first opposite surface LS2 (shown in FIG. 2) facing and opposite to the first lead-out surface LS1. In addition, a first inner surface 733 of the first hard case 730 may have a rounded inner profile that substantially matches the outer profile of the electrode assembly 10.

In addition, in the second hard case 740 of the hard case 720, each of second connection surfaces SS3 and SS4 of the second lateral surface 742 may have a rounded corner where each of the second connection surfaces SS3 and SS4 and the second bottom surface 741 meet, which would reduce unnecessary space from the second hard case 740 between the electrode assembly 10 and the second hard case 740. The second connection surfaces SS3 and SS4 may be connected to a second lead-out surface SS1, from which the first electrode tab 15 and the second electrode tab 16 are drawn out, and a second opposite surface SS2 facing and opposite to the second lead-out surface SS1. In addition, a second inner surface 743 of the second hard case 740 may have a rounded inner profile that substantially matches the outer profile of the electrode assembly 10.

As described above, in the secondary battery according to another embodiment of the present invention, the hard case 720 having the aforementioned configuration is provided, including the first hard case 730 and the second hard case 740, thereby increasing resistance against external impacts, reducing consumption of electrolyte due to an unnecessary space existing between the hard case 720 and the electrode assembly 10 and preventing the electrode assembly 10 from moving inside the hard case 720 by eliminating the unnecessary space.

Meanwhile, although not illustrated in the drawing, the shape of the hard case 720 including the first hard case 730, as shown in FIG. 10, may also be applied to the hard cases 120, 220, 320, 420, and 620 shown in FIGS. 4, 5, 6, 7, and 9, respectively.

A secondary battery according to still another embodiment of the present invention will now be described.

Figure 11:
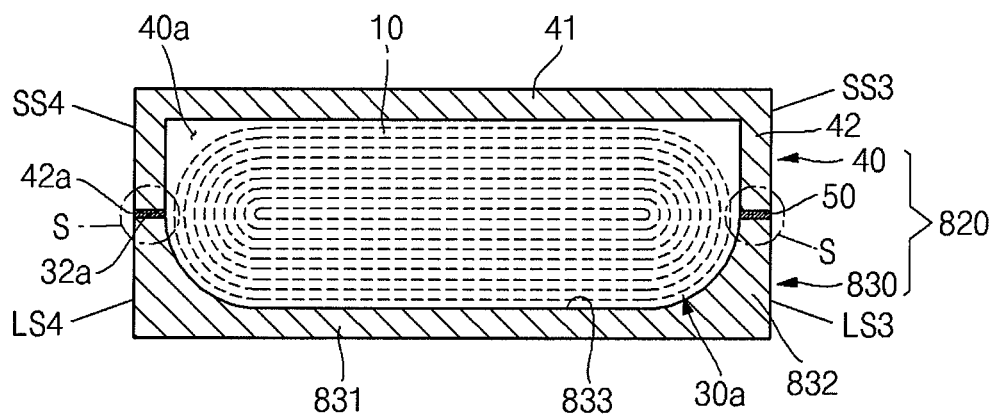
FIG. 11 is a sectional view illustrating components corresponding to those of the secondary battery shown in FIG. 3 in a secondary battery according to still another embodiment of the present invention.

FIG. 11 is a sectional view illustrating components corresponding to those of the secondary battery shown in FIG. 3 in a secondary battery according to still another embodiment of the present invention.

The secondary battery according to the present embodiment is substantially the same as the secondary battery 100 shown in FIG. 2 with respect to its configuration and functions, except for features of a hard case 820. Thus, repetitive explanations will not be provided and the following description will focus on the hard case 820.

Referring to FIG. 11, the hard case 820 may include a first hard case 830 having a first bottom surface 831 and a first lateral surface 832, and a second hard case 40 having a second bottom surface 41 and a second lateral surface 42.

The hard case 820 in the present embodiment is substantially the same as the hard case 20 shown in FIG. 3, except that a first inner surface 833 of the first hard case 830 has a rounded inner profile that substantially matches the outer profile of an electrode assembly 10.

As described above, in the secondary battery according to still another embodiment of the present invention, the hard case 820 may include the first hard case 830 and the second hard case 40, thereby reducing waste of electrolyte that may occur as a result of a dead space between the hard case 820 and the electrode assembly 10, and preventing the electrode assembly 10 from moving inside the hard case 820 with the elimination of the dead space.

Meanwhile, although not illustrated in the drawing, the shapes of the hard case 820 including the first hard case 830 and the second hard case 40, as shown in FIG. 11, may also be applied to the hard cases 120, 220, 320, 420, and 620 as shown in FIGS. 4, 5, 6, 7, and 9, respectively.

A secondary battery according to still another embodiment of the present invention will now be described.

Figure 12:
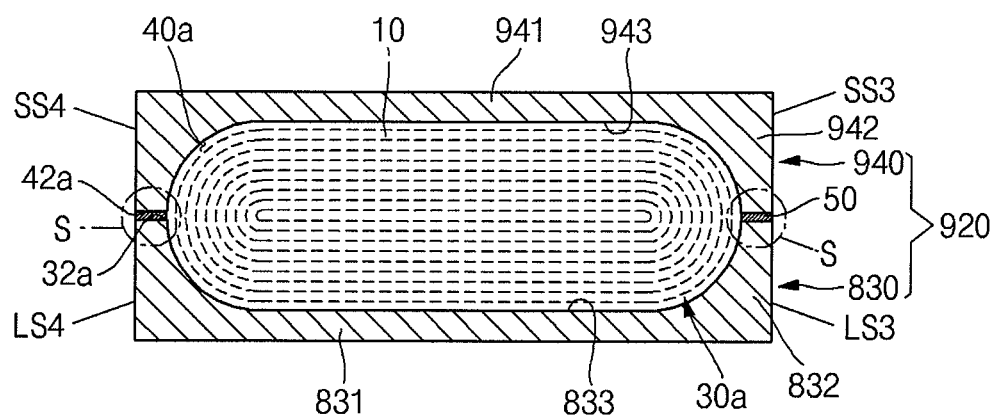
FIG. 12 is a sectional view illustrating components corresponding to those of the secondary battery shown in FIG. 3 in a secondary battery according to still another embodiment of the present invention.

FIG. 12 is a sectional view illustrating components corresponding to those of the secondary battery shown in FIG. 3 in a secondary battery according to still another embodiment of the present invention.

The secondary battery according to the present embodiment is substantially the same as the secondary battery 100 shown in FIG. 2 with respect to its configuration and functions, except for the features of a hard case 920. Thus, repetitive explanations will not be provided and the following description will focus on the hard case 920.

Referring to FIG. 12, the hard case 920 may include a first hard case 830 having a first bottom surface 831 and a first lateral surface 832, and a second hard case 940 having a second bottom surface 941 and a second lateral surface 942.

The hard case 920 in the present embodiment is substantially the same as the hard case 20 shown in FIG. 3, except that first and second inner surfaces 833 and 943 of the first and second hard cases 830 and 940 have rounded inner profiles that substantially match the outer profile of an electrode assembly 10, respectively.

As described above, in a secondary battery according to still another embodiment of the present invention, the hard case 920 may include the first hard case 830 and the second hard case 940, thereby reducing waste of electrolyte that may occur as a result of a dead space between the hard case 820 and the electrode assembly 10, and preventing the electrode assembly 10 from moving inside the hard case 920 by elimination of the dead space.

Meanwhile, although not illustrated in the drawing, the shapes of the hard case 920 including the first hard case 830 and the second hard case 940, as shown in FIG. 12, may also be applied to the hard cases 120, 220, 320, 420, and 620 shown in FIGS. 4, 5, 6, 7, and 9, respectively.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A secondary battery comprising:
   an electrode assembly comprising a first electrode plate, a second electrode plate and a separator interposed between the first and second electrode plates wherein the electrode assembly defines an outer perimeter;
   an electrolyte; and
   a battery case, the battery case comprising:
   a first portion having a bottom surface with edges that has side walls extending from the edges of the bottom surface in a direction that is perpendicular to the plane of the bottom surface that defines an interior space and a plurality of lateral surfaces having an end at the end of the side walls;
   a second portion that is separate from the first portion having a bottom surface edges that has side walls extending from the edges of the bottom surface in a direction that is perpendicular to the plane of the bottom surface that defines an interior space and a plurality of lateral surfaces having an end at the end of the side walls wherein the first and second portions define an enclosed space that receives the electrode assembly and wherein the ends of the lateral surfaces of the first and second portion surround the entire outer perimeter of electrode assembly; and an adhesive layer that contacts a surface of the end of the lateral surfaces of the first portion and a surface of the end of the lateral surfaces of the second portion wherein first portion and the second portion of the battery case are coupled to each other only via the adhesive that is interposed between the surface of the first portion and the surface of the second portion and so that the adhesive layer surrounds the entire outer perimeter of the electrode assembly within the interior space and adheres the ends of the lateral surfaces of the first and second portions together;

wherein the first and second portions of the battery case are combined so as to collectively enclose the electrode assembly and contact the electrolyte, and the electrolyte and the electrode assembly are accommodated in a space provided by combination of the first and second portions, wherein the adhesive layer is continuous between the first and second portions and wherein the ends of the lateral surfaces of the first and second portions of the battery case that contact the adhesive are positioned so as to be positioned inward of the outer surfaces of the first and second portions of the battery case.

2. The secondary battery of claim 1, further comprising a first metal layer disposed on an outer surface of the first portion and a second metal layer disposed on an outer surface of the second portion, wherein the adhesive layer contacts a surface of, the first metal layer and a surface of the second metal layer, and wherein the adhesive layer is continuous between the first and second metal layers.

3. The secondary battery of claim 2, wherein the first and second metal layers comprise a material selected from the group consisting of aluminum, nickel, iron and copper.

4. The secondary battery of claim 1, further comprising a first metal layer disposed between inner and outer surfaces of the first portion, and a second metal layer disposed between inner and outer surfaces of the second portion.

5. The secondary battery of claim 4, wherein the adhesive layer contacts a surface of the first metal layer and a surface of the second metal layer, and wherein the adhesive layer is continuous between the first and second metal layers.

6. The secondary battery of claim 1, further comprising a first metal layer disposed on an inner surface of the first portion and a second metal layer disposed on an inner surface of the second portion, wherein the adhesive layer contacts a surface of the first metal layer and on a surface of the second metal layer, and wherein the adhesive layer is continuous between the first and second metal layers.

7. The secondary battery of claim 6, wherein the first and second metal layers comprise at least a material selected from the group consisting of aluminum, nickel, iron and copper.

8. The secondary battery of claim 1, further comprising a first thermal conduction layer disposed between inner and outer surfaces of the first portion, and a second thermal conduction layer disposed between inner and outer surfaces of the second portion.

9. The secondary battery of claim 8, wherein the adhesive layer contacts a surface of the first thermal conduction layer and a surface of the second thermal conduction layer, and wherein the adhesive layer is continuous between the first and second thermal conduction layers.

10. The secondary battery of claim 8, wherein the first thermal conduction layer and the second thermal conduction layer comprise ceramic powder in a polymer fiber or non-woven fabric.

11. The secondary battery of claim 1, wherein at least one of the first and second portions comprises a plate shape.

12. The secondary battery of claim 1, wherein the at least one of the first and second portions comprising the main surface and two opposing lateral edges extending from opposing sides the main surface has a rectangular or a round shape.

13. The secondary battery of claim 1, wherein both the first portion and the second portion comprise main surfaces and two opposing lateral edges extending from opposing sides of the main surface, and wherein the ends of the lateral edges of the first portion comprises accommodating portions to secure ends of the lateral edges of the second portion.

14. The secondary battery of claim 13, wherein the accommodating portions comprise grooves.

15. The secondary battery of claim 13, wherein at least one of the first portion and the second portion of the battery case has a thickness of approximately 0.3 mm or greater.

16. The secondary battery of claim 1, wherein at least one of the first and second portions is formed of a material selected from the group consisting of polyolefine-based resin, epoxy resin, polycarbonate resin, polyethyleneterephthalate resin, polyetheretherketone resin, high-density polyethylene resin, and acryl-based resin.

17. The secondary battery of claim 1, wherein at least one of the first and second portions comprises a thickness of approximately 0.5 mm or greater.

18. The secondary battery of claim 1, wherein at least one of the first and second portions comprises a Rockwell hardness of at least 55 R scales or greater.

19. The secondary battery of claim 1, wherein the adhesive layer comprises a thermally adhesive material.

20. The secondary battery of claim 1, wherein the adhesive layer comprises modified polyolefine-based material, a modified polypropylene material, a casted polypropylene material or an acid-modified polypropylene material.

21. The secondary battery of claim 1, wherein the first and second portions comprise a melting point higher than that of the adhesion layer.

22. The secondary battery of claim 1, wherein an electrolyte is disposed between the electrode assembly and the battery case.

23. The secondary battery of claim 19, wherein the adhesive layer is thermally bonded at 130° C., or greater.

* * * * *